UNITED STATES PATENT OFFICE.

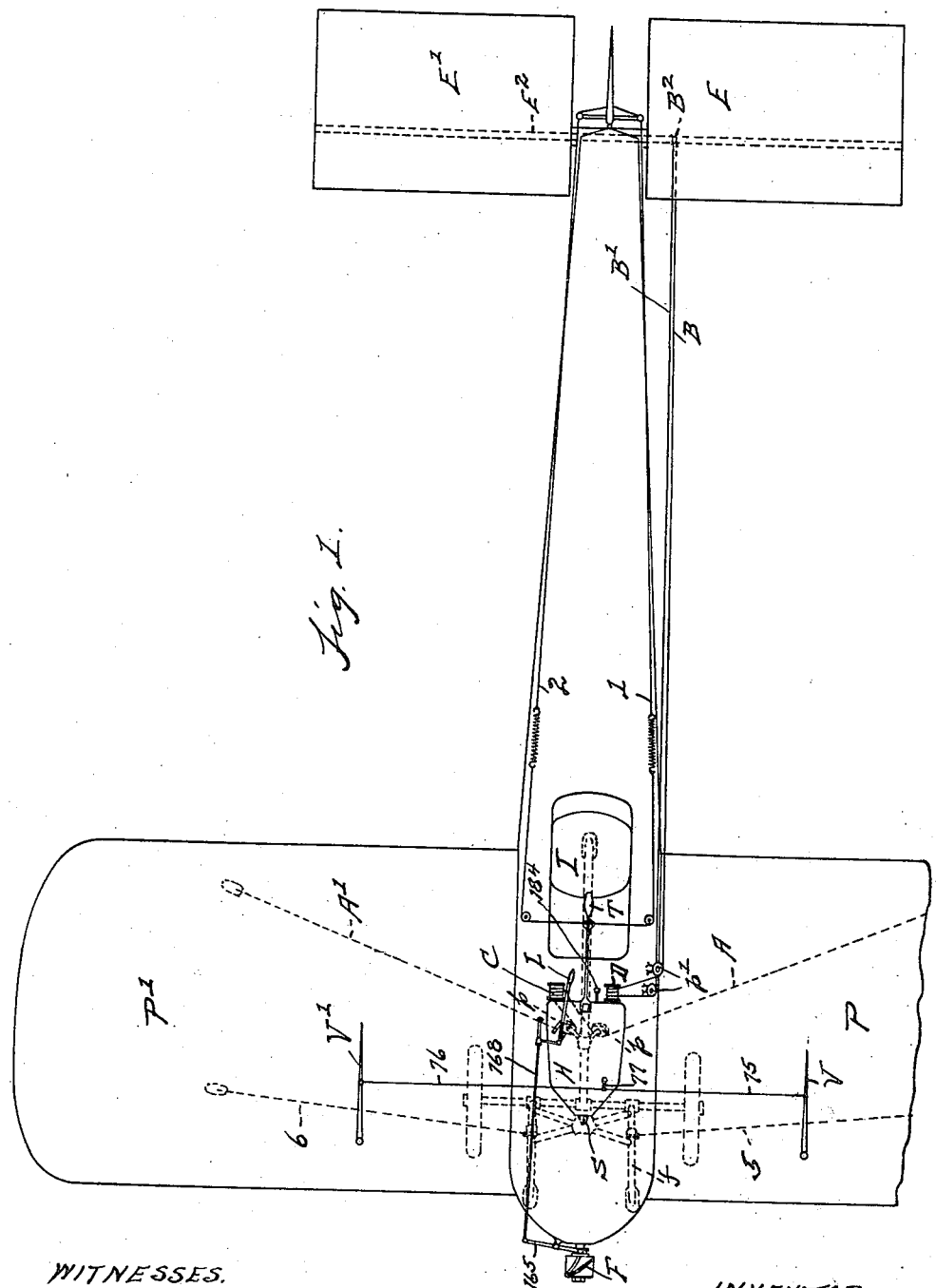

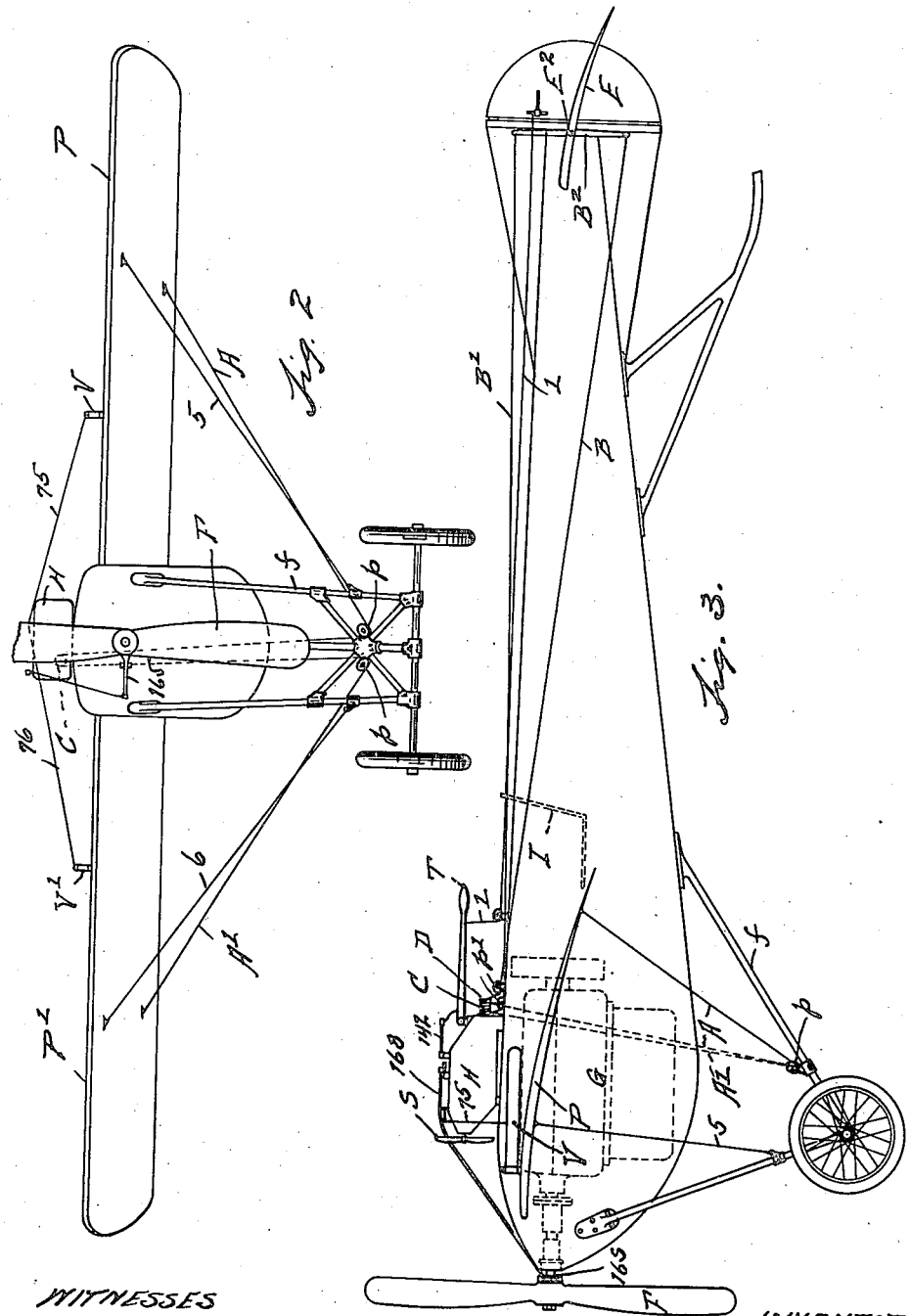

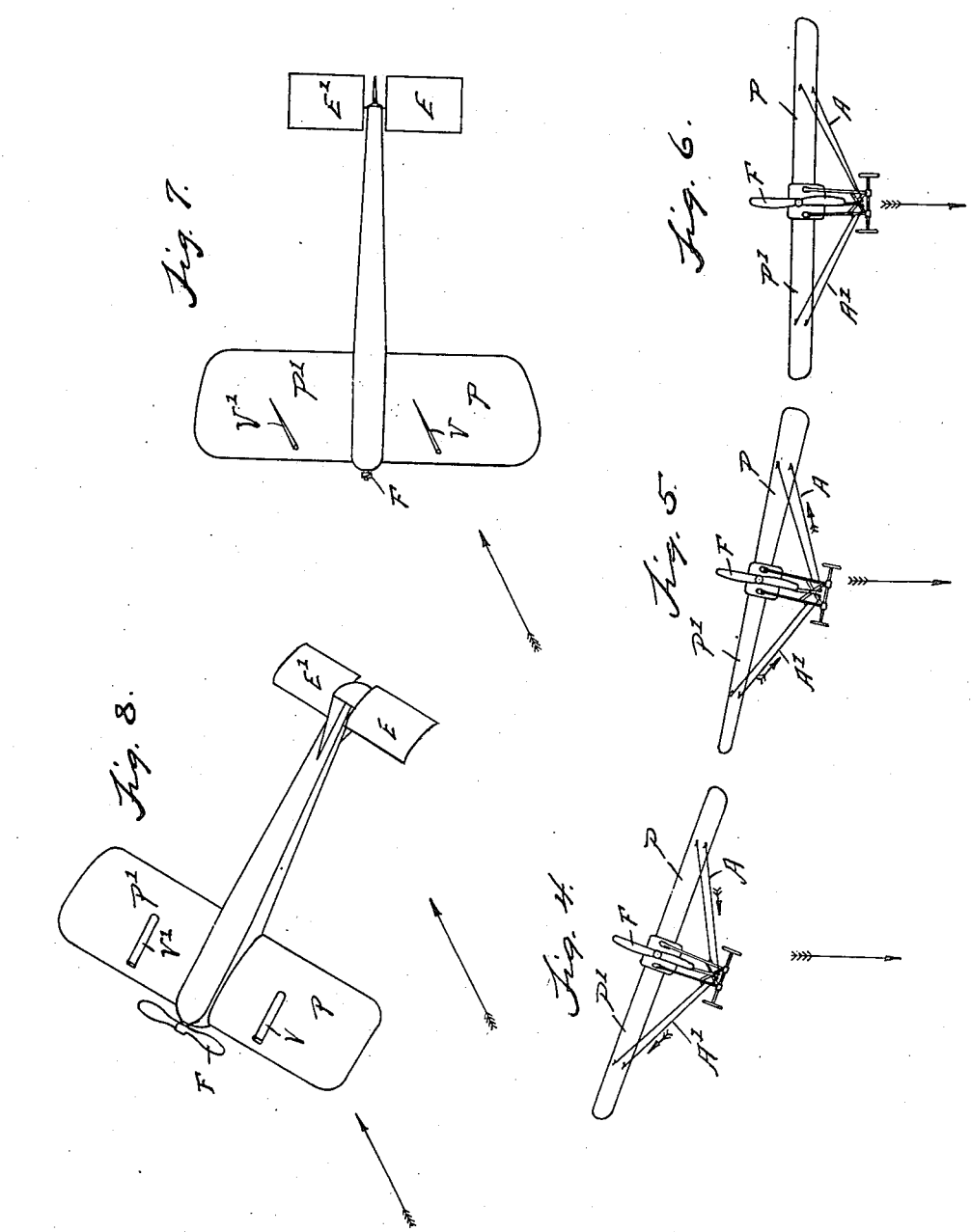

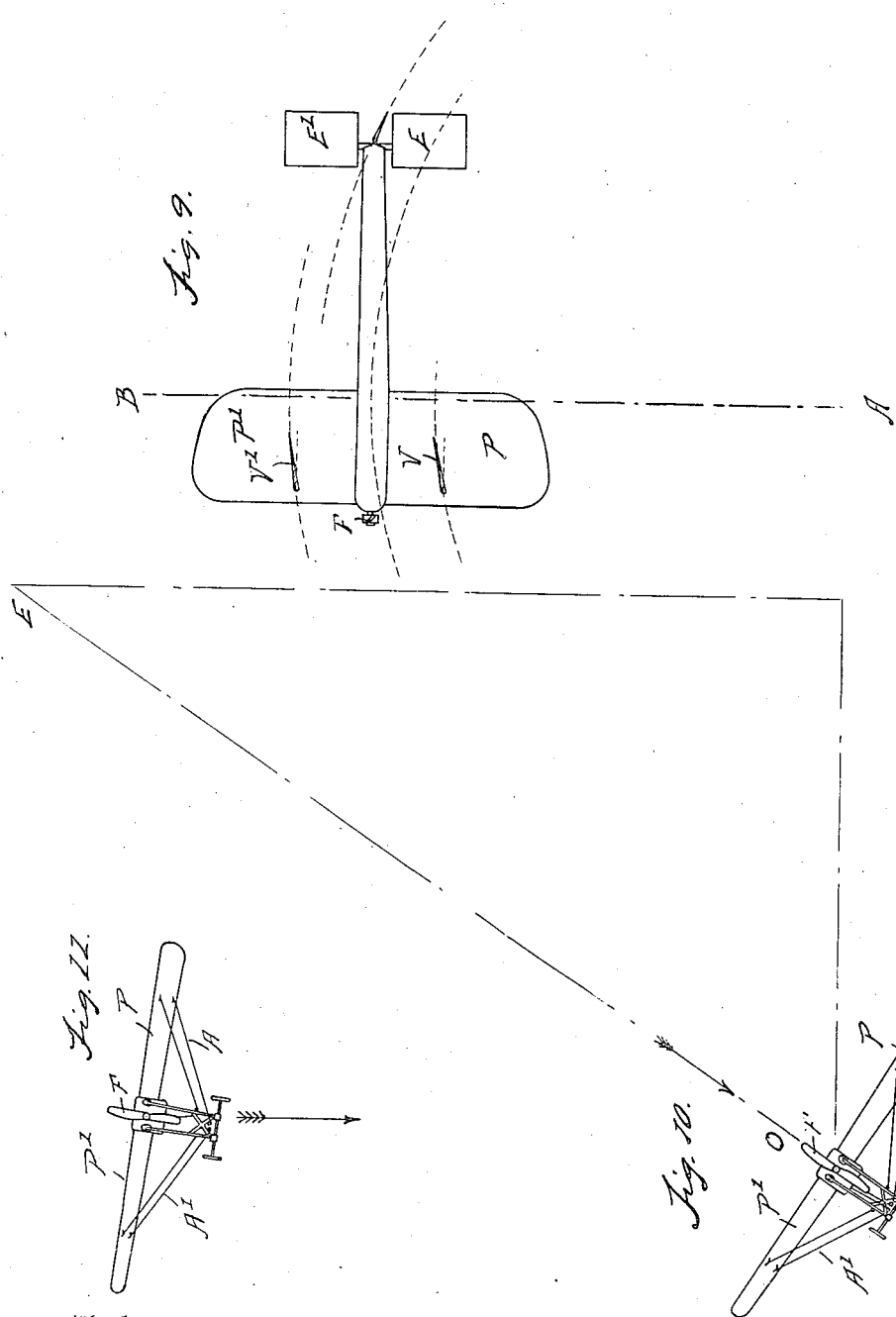

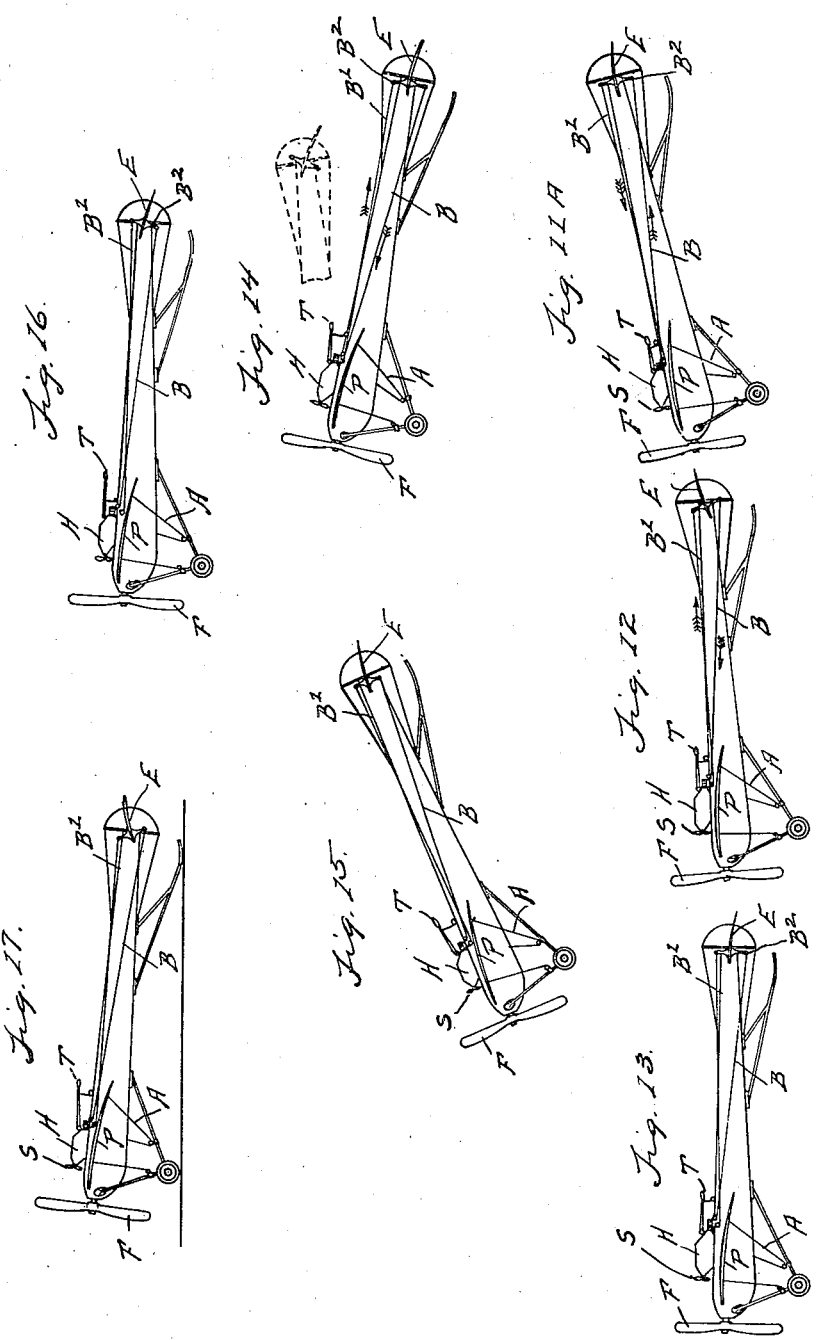

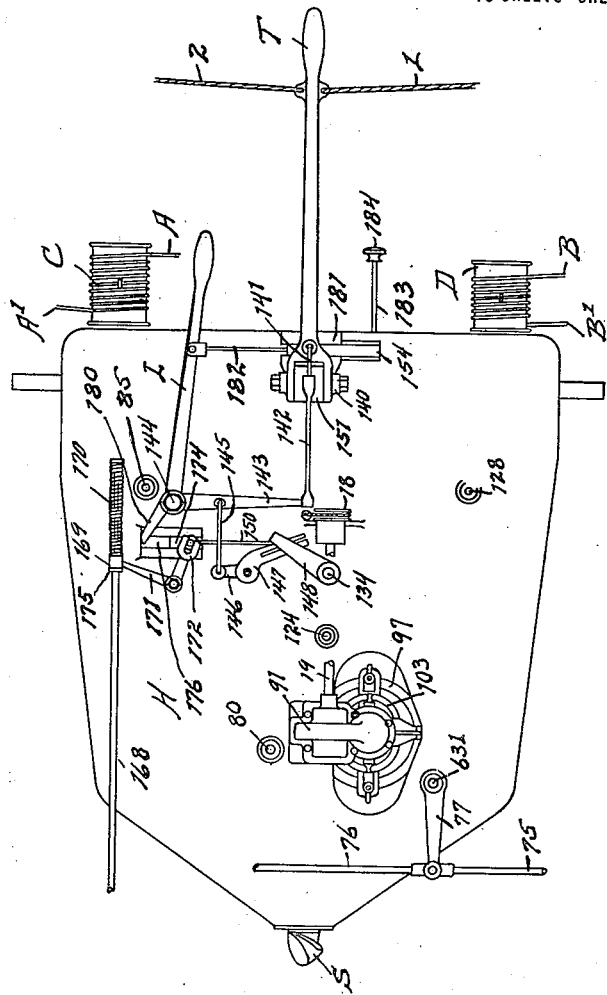

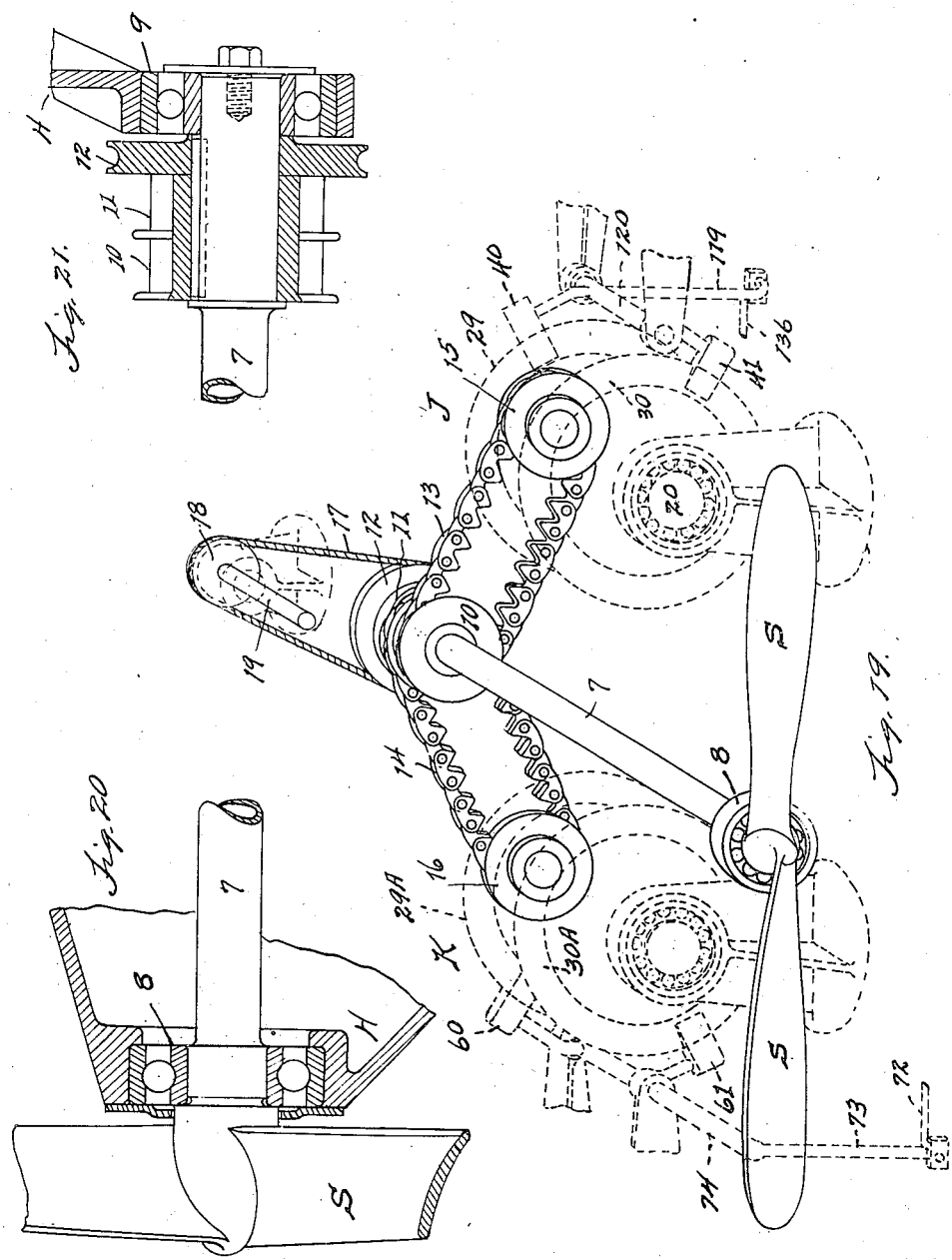

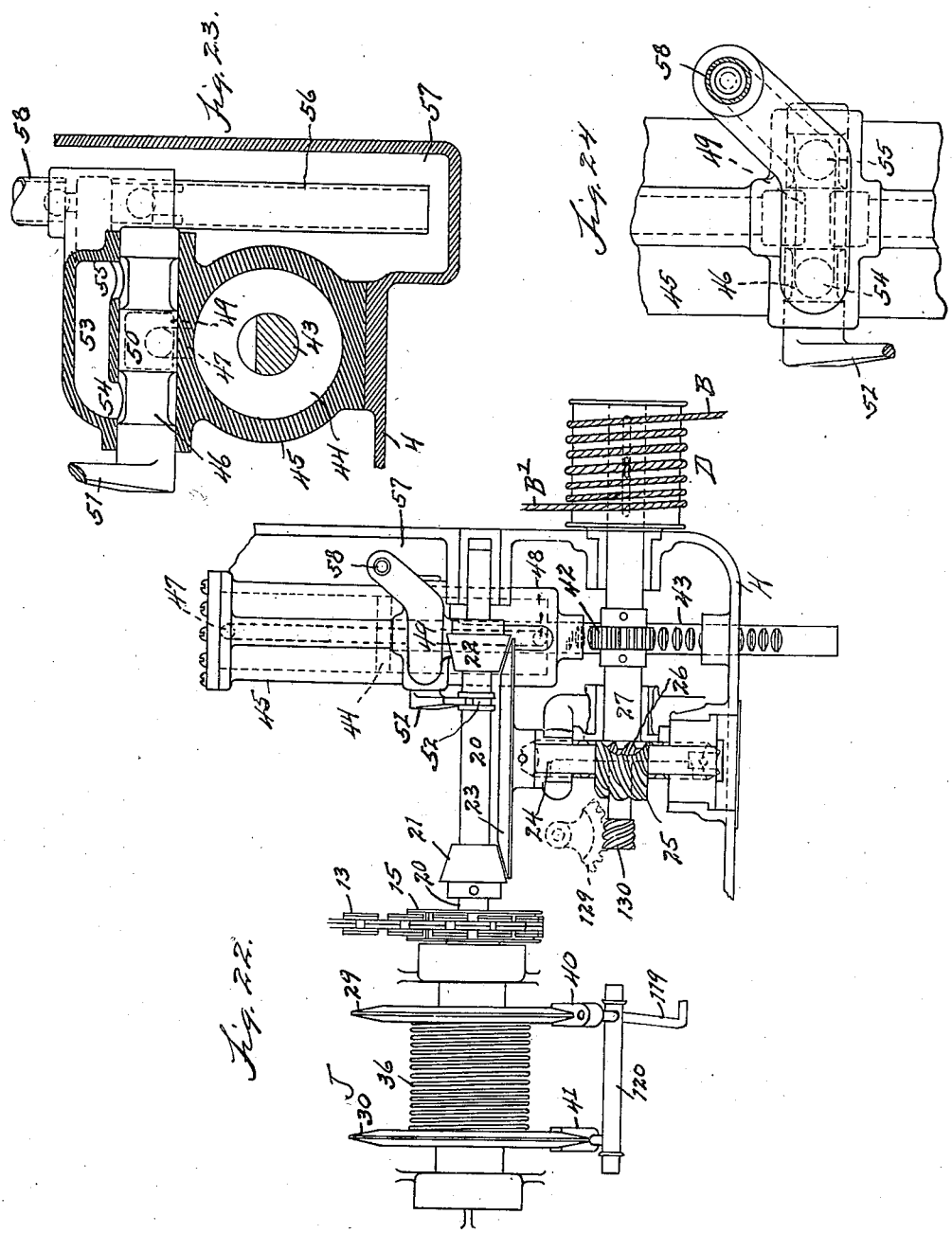

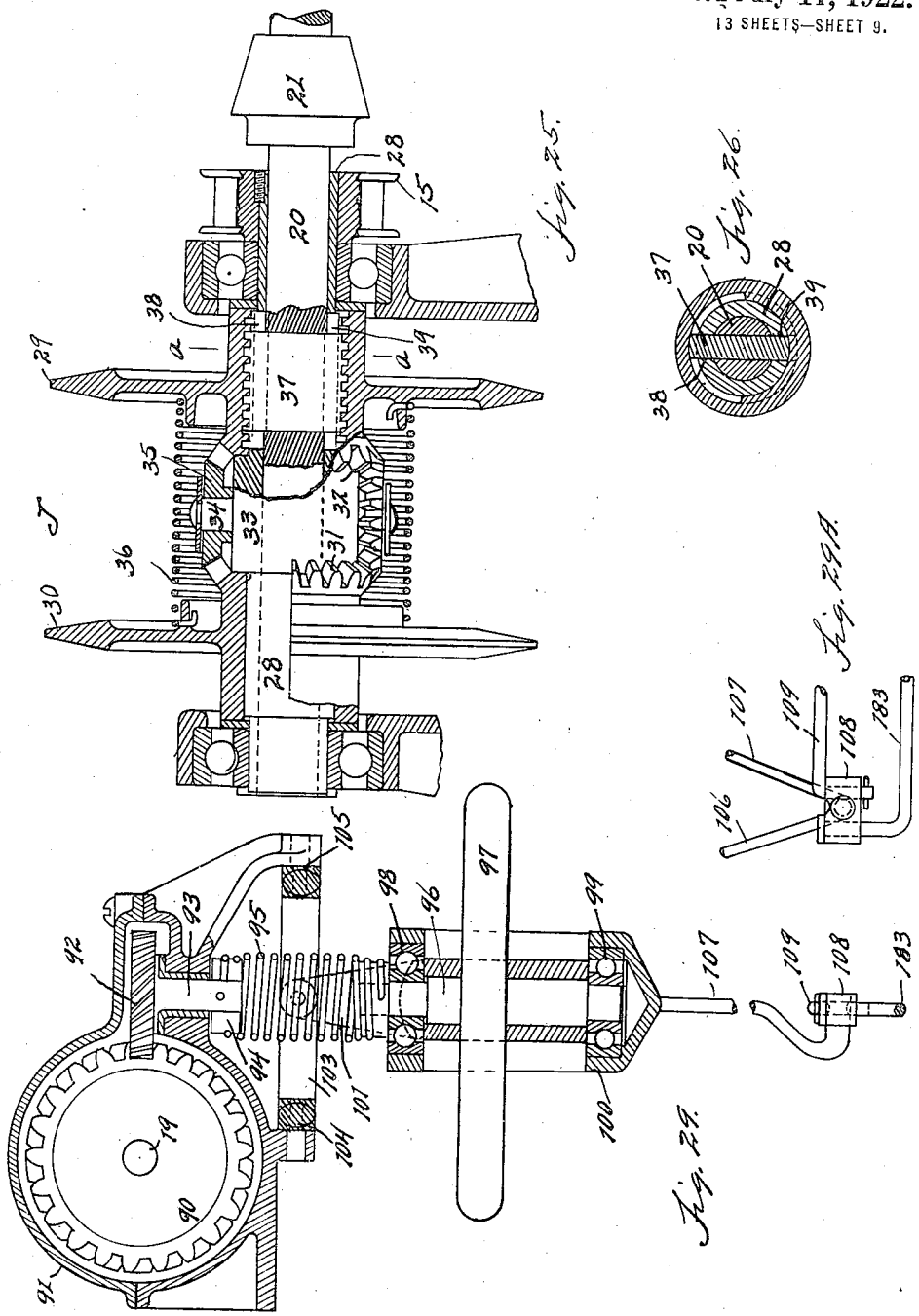

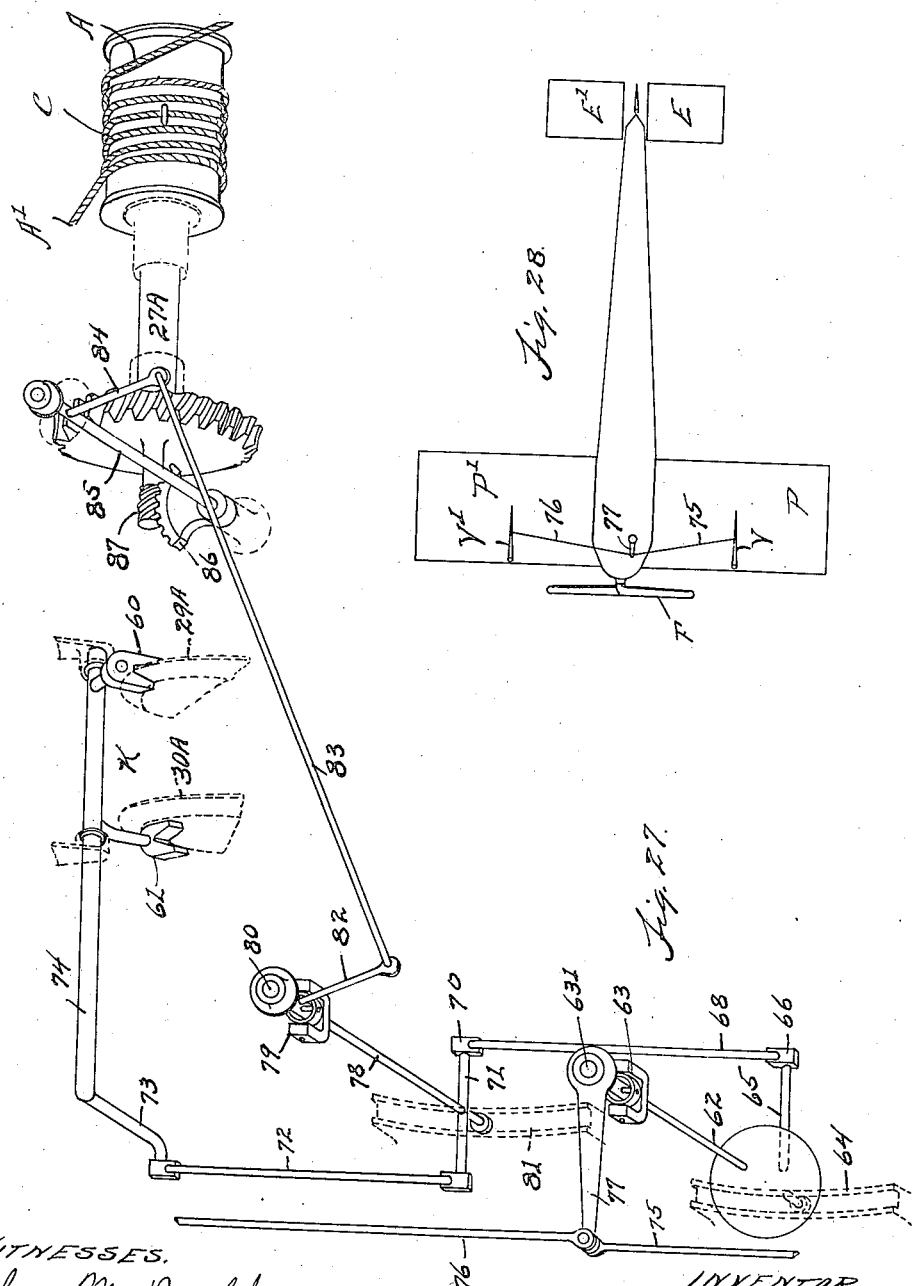

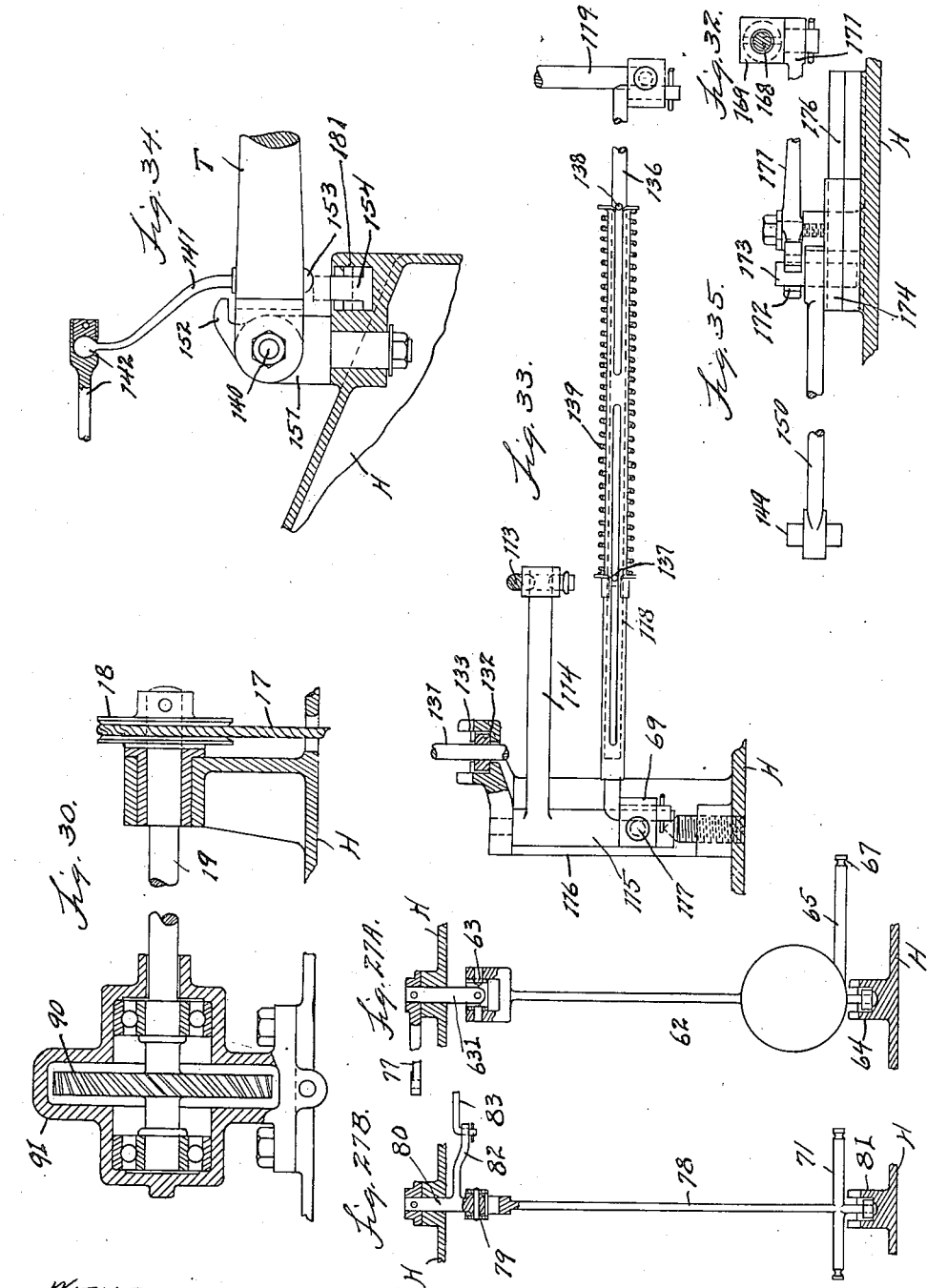

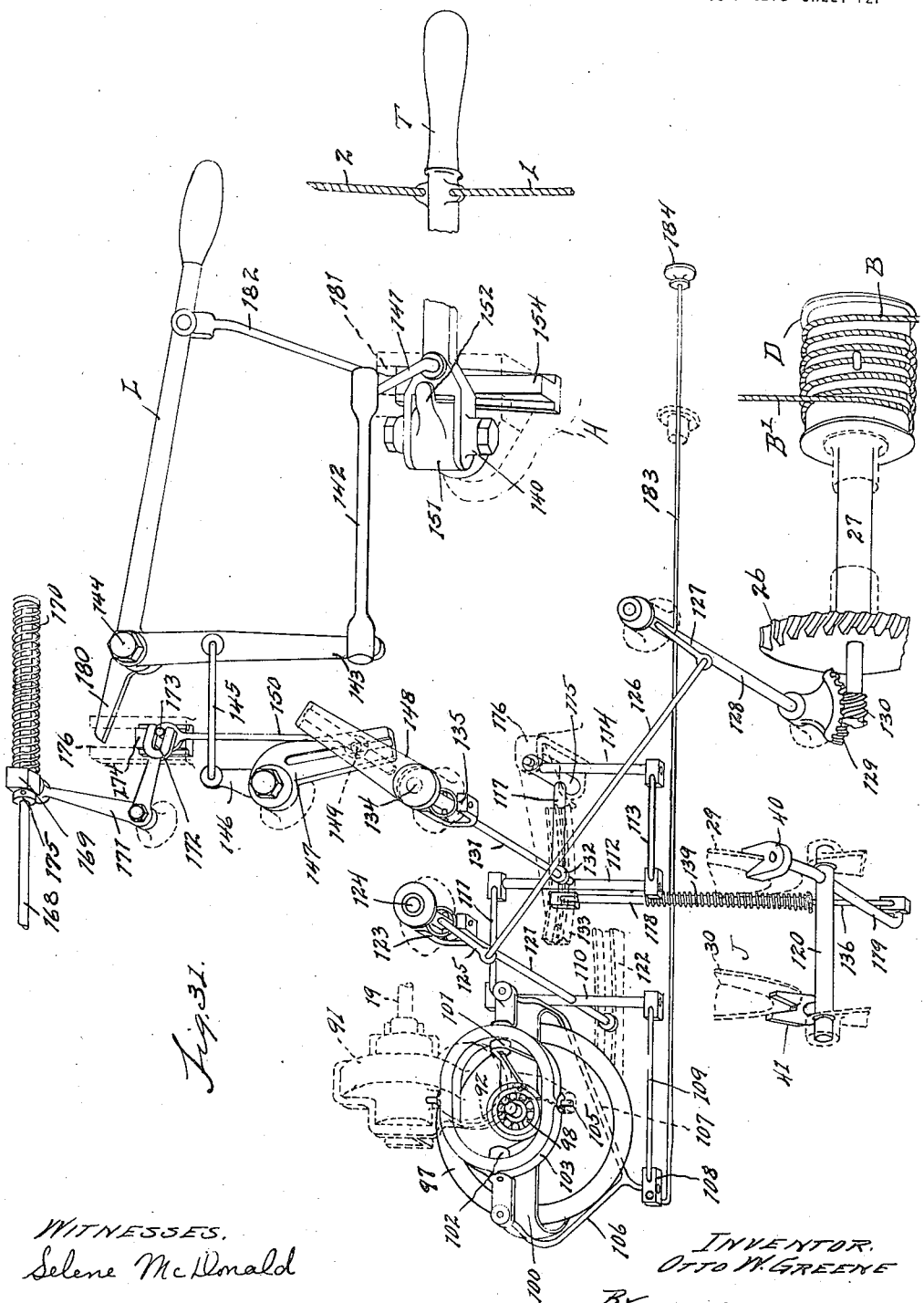

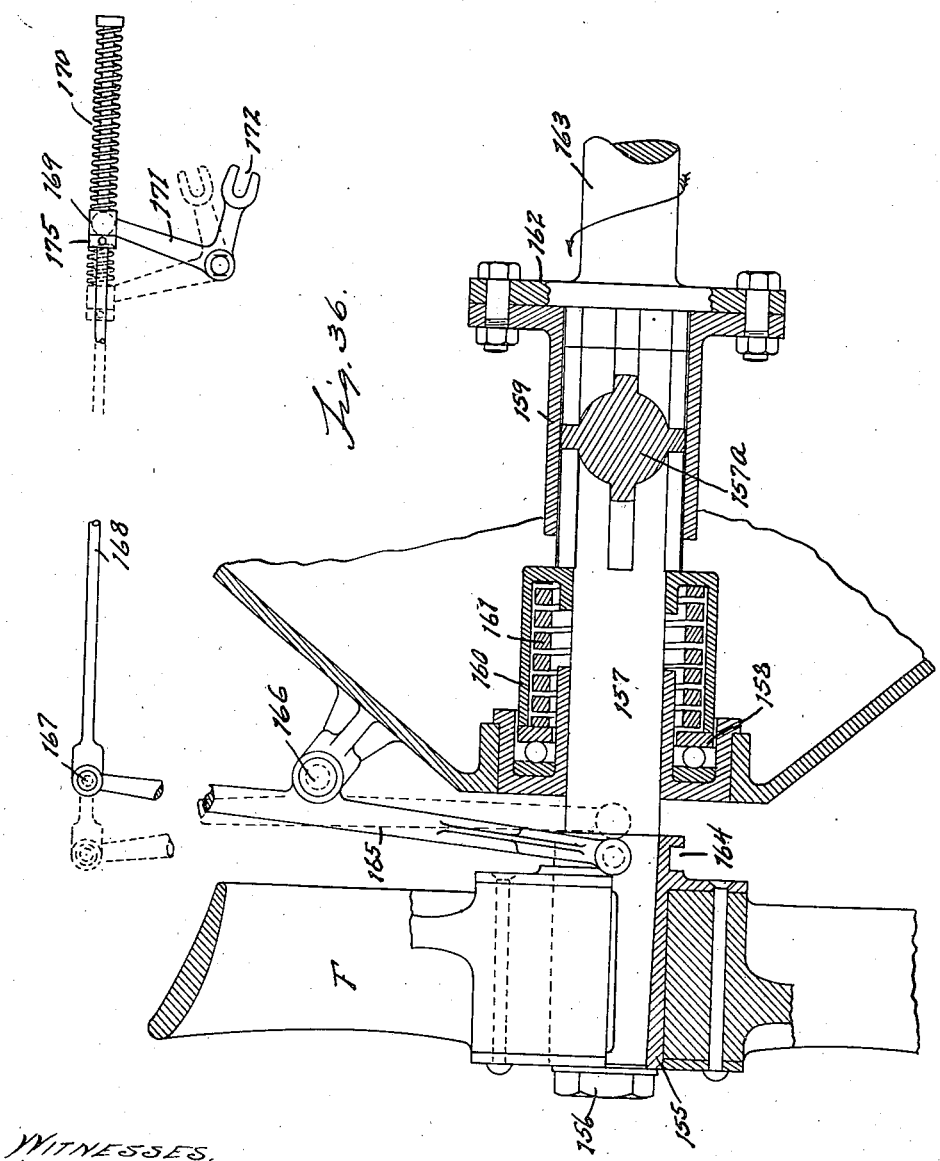

OTTO W. GREENE, OF ELYRIA, OHIO, ASSIGNOR TO THE GREENE AERONAUTICAL COMPANY, OF ELYRIA, OHIO, A CORPORATION OF OHIO.

AEROPLANE.

1,422,197.  Specification of Letters Patent.  Patented July 11, 1922.

Application filed March 27, 1914. Serial No. 827,532.

*To all whom it may concern:*

Be it known that I, OTTO W. GREENE, a citizen of the United States, residing at Elyria, county of Lorain, State of Ohio, have invented a certain new and useful Improvement in Aeroplanes, and declare the following to be a full, clear, and exact description of the same, such as will enable others skilled in the art to which it pertains to make and use the same, reference being had to the accompanying drawings, which form a part of this specification.

This invention relates to aeroplanes, the lifting effect of which is produced by the propulsion of the device through the air, and a primary object of the invention is an aeroplane automatically maintained in equilibrium during flight. In aeroplanes of various types, now common in use, as the monoplane, biplane, etc., the machine is maintained in equilibrium through the manual operation of control levers and a successful flight of the device therefore depends largely upon the skill of the aviator in operating the various control levers to counteract the disturbing effect of a momentary gust of wind or other force tending to unbalance the machine. The machine which forms the subject matter of this invention in its progress through the air in ascending or descending or turning to one side or the other, is under control of the aviator, while the means for maintaining the balance of the machine about one or more of the longitudinal, lateral and vertical axes are brought into operation by the force tending to unbalance the machine, the operation of which does not effect the guidance of the machine and which balancing means performs its function without the exercise of judgment on the part of the aviator either to maintain in or return the machine to the position of equilibrium.

In the devising of means whereby this general object may be attained and the aeroplane made safe and stable and the device readily operable by persons without special knowledge of the effect of air currents, or the operation of other laws governing the flight of machines of this nature, several secondary objects and novel features of construction are involved among which may be mentioned a means independent of the control of the aviator for setting the machine at a gliding angle under the action of gravity whenever the propelling means becomes inoperative. Also means for preventing an oscillation of the machine about its longitudinal axis, produced through the warping of the wings to overcome the effect of a sudden gust of wind and also to dampen such oscillation and bring the machine to normal equilibrium. A further object is involved in the means for maintaining the machine in balance while turning a curve, in which condition the lifting effect on the inner side of the machine is less than that on the outer by reason of its turning on a shorter radius and thus travelling at a slower rate of speed, and also involved in the means through which the machine may automatically adjust itself to counteract the detrimental effect of gusts of wind while making such turn.

These and other objects and novel features of construction are hereinafter more fully described and claimed and shown in the accompanying drawings in which—

Figs. 1, 2 and 3 show respectively a plan, end elevation, and side elevation of a monoplane embodying my invention.

Figs. 4, 5 and 6 show a front view of an aeroplane in various positions.

Figs. 7 and 8 show a plan view of the machine under action of a side wind.

Fig. 9 is a plan view of the machine while turning a curve.

Fig. 10 is a front elevation of a machine in turning a curve.

Fig. 11 shows a diagrammatic front view of the machine with one wing set to lift more than the other to provide for a shifting weight carried by the machine.

Figs. 11<sup>A</sup> to 17 are diagrammatic views of an aeroplane in various attitudes assumed in flight. Fig. 17 shows the plane at rest upon the ground in the position of starting.

Fig. 18 is an enlarged plan view of the box containing the principal control apparatus positioned upon the upper side of the plane.

Fig. 19 is a perspective view of part of the wind wheel and connected apparatus through which power is derived to operate various parts of the mechanism.

Fig. 20 is a detail of the wind wheel mounting.

Fig. 21 shows the support for the rear end of the wind wheel shaft.

Fig. 22 is an assembled detail view of the control clutch and self-locking windlass to which the power of the wind wheel is applied.

Figs. 23 and 24 are details showing the hydraulic valve for locking the winding drum.

Fig. 25 is a detail partly in section of an automatic clutch.

Fig. 26 is a section on line a—a of Fig. 25.

Fig. 27 is a perspective view of the swinging weight and its connection to the automatic clutch and winding drum.

Fig. 27$^A$ is a detail of the mounting of the swinging weight.

Fig. 27$^B$ is an elevation of a compensating device shown in Fig. 27.

Fig. 28 is a diagram of an aeroplane in plan view showing the position of vanes and their connection to the control apparatus.

Fig. 29 is a detail of the gyroscope utilized in maintaining for-and-aft balance and control.

Fig. 29$^A$ is a detail in side elevation showing the levers connecting with the lower end of the gyroscopic frame.

Fig. 30 is a detail of the mechanism for driving the gyroscope.

Fig. 31 is a perspective view of the gyroscope and the levers connecting it with other related parts of the machine.

Fig. 32 is a detail of a sliding block on a control rod.

Fig. 33 is a detail of one of the connections to the levers for operating the shoes of the automatic clutch.

Fig. 34 is a detail of the mounting for the tiller lever.

Fig. 35 is a detail of the mounting of the control lever, shown in Fig. 31.

Fig. 36 is a detail of the mechanism employed in turning the machine to a gliding angle upon a failure of the propelling mechanism.

Similar characters refer to similar parts throughout the drawings and specification.

The machine shown by the drawings is what is known as a monoplane, but as hereinafter shown the apparatus, through operation of which the machine is maintained in equilibrium, may be readily adapted for use with any flying machine depending wholly or in part for its control on the movement of inclined planes through the air by power. The machine is shown as provided with a rudder by means of which the machine may be guided through operation of a tiller and the connecting cords or cables 1 and 2, shown plainly in Fig. 1. The machine shown is provided with large sustaining planes P and P$^1$, whose angle of inclination to the air may be altered through operation of cables A and A$^1$ attached to the rear lower side of the planes and near the outer extremity thereof, thence passing through the pulleys $p$ supported on the frame $f$, near the center of the machine and thence to the winding drum C. By rotation of the drum C, the wings or planes may be flexed and one wing set at a greater angle to the air than the other to vary the lifting power. The planes are held at the forward edges by the guy wires 5 and 6 rigidly attached to the frame and about which, as centers, they are capable of deflection.

The machine is also provided at the rear end with the usual small pivotally supported horizontal planes E and E$^1$ controlled through operation of the cables B and B$^1$ attached to the lower and upper ends respectively of the lever B$^2$. The opposite ends of the cables pass around the pulleys $p^1$ to the winding drum D, rotation of which will vary the angle of the planes E and E$^1$ through rotation of the supporting shaft E$^2$, and the machine thus made to ascend or descend.

Normally the machine is moved through the air by rotation of the propeller F actuated by means of an engine G, indicated by dotted lines in Fig. 3.

The above generally enumerated parts are believed essential, at least, in any "heavier than air" machine capable of flight, and the type here shown has been selected as being of the simplest form involving the functions of an aeroplane. It is to be understood however, that the automatic control parts hereinafter more particularly described may be adapted for the control of any machine in which the said general elements are found.

In any apparatus adapted to maintain a flying machine in equilibrium in the air there are several essential elements involved, viz; first, a source of power which may be operated independently of the mechanical power for forcing the machine through the air, second a lateral control actuated by disturbance of the lateral balance to apply such power to right the machine, third, a fore-and-aft control actuated, through a change in position of the vertical axis of the machine produced by any external cause, to utilize the independent power to right the machine, fourth a vertically positioned vane or vanes pivotally mounted at their forward ends adapted to be actuated by a change in the direction of the flow of air past the machine and through the deflection of which the said source of power is utilized to balance the machine in opposition to such external force, and fifth, an element or elements cooperating with either or all of the above named elements to prevent action of such elements greater than is required to right the machine in opposition to the applied disturbing force, and through the operation of which an oscillation about the longitudinal or the vertical axis is prevented.

In all aeroplanes if the propeller (in this case propeller F) be rotated by the engine G at its normal flying speed, the machine will maintain a normal speed of movement through the air subject to some variations due to gusts of wind or other air conditions, and this movement of the machine through the air enables the elevating planes E and E¹ to change the fore-and-aft angles to the horizontal if rotated about the center shaft by the cords B, B¹. In the ordinary machines at present in use there is little probability that gusts or change in velocity of movement of the air would so suddenly occur that such change would equal the speed of the machine which in the present state of the art ranges from 40 to 125 miles per hour. Such gusts would alter the sustaining effect of the planes only in the case of a sudden decrease in the velocity of the wind, if the aeroplane is moving against it or a sudden increase in its velocity if the aeroplane is moving with the wind. If the gust becomes constant, the engine and propeller would soon cause the machine to pick up the speed and normal conditions be again attained, and if the change be of short duration the machine would have but a momentary impairment of function. Therefore, if the planes E and E¹ be controlled, the forward movement of the machine may be controlled and its speed maintained at normal as the machine may be made to descend to pick up speed or ascend as occasion may demand.

As the speed of movement of an aeroplane through the air may thus be readily maintained at a rate higher than the lowest rate possible adapted to maintain the machine in flight, I have, in the embodiment of my invention illustrated, utilized a wind wheel as the most convenient and dependable source of power independent of the propelling mechanism capable of operating means adapted to maintain the machine in equilibrium at all times.

The major part of the automatic control apparatus is preferably inclosed in a box H mounted on the upper side of the aeroplane as shown more particularly in Fig. 1, to the rear of which is the aviator's seat I, and such levers as require manipulation extend toward the seat from said box. The wind wheel power apparatus is shown somewhat diagrammatically in Fig. 19, and consists of a wheel S, facing the front of the machine and situated at the front end of the box H. The propeller blades are attached to a shaft 7 mounted in the bearing 8 at the front end of the box H, as shown in Fig. 20, and in a bearing 9 at the rear end of the box H, as shown in Fig. 21. Keyed to the shaft at the rear end are the pulleys 10, 11 and 12. The pulleys 10 and 11 may be provided with belts but preferably are of the nature of sprocket wheels in which the chains 13 and 14 shown in Fig. 19 engage respectively. These chains in turn pass about the pulleys 15 and 16 upon opposite sides of the propeller shaft and are attached respectively, as hereinafter more fully described, to the shafting of the companion clutch devices J and K, whose shafts are parallel with the shaft 7, and which shafts are thus continuously operated.

Through intermediate mechanism the clutch J controls the operation of the winding drum D, through which the elevating planes are manipulated. Likewise the clutch mechanism K controls the operation of the winding drum C through which the sustaining planes are flexed. About the pulley 12 is a chain or cable 17 which passes about the pulley 18 on the shaft 19, through operation of which shaft the gyroscope, hereinafter more fully described, is maintained in operation and through the medium of which fore-and-aft control is automatically attained.

The automatic clutches J and K and connected devices for operating the winding drums C and D are alike in all general respects and a description of the operation of one group is considered sufficient for both. One of the clutch devices J, winding drum D, and related apparatus, is shown in assembled form in Fig. 22, details of parts of the mechanism being shown in Figs. 23, 24 and 25. The clutch mechanism J has a shaft 20 constantly driven through operation of the pulley or sprocket 15 and chain 13, and this shaft 20 is provided with two bevel friction wheels 21 and 22 adapted to engage the bevel friction disc 23 on a shaft 24, at right angles to the shaft 20. The shaft 24 is provided with a worm 25 meshing with a worm wheel 26 situated below the shaft 24 and to which the shaft 27 is keyed, and at the outer end of the shaft 27 is secured the winding drum D about which the cords B and B¹ are wound. Rotation of the drum in either direction changes the angle of inclination of the planes E and E¹ to the horizontal to ascend or descend, depending upon the direction of rotation. As the shaft 20 is continuously operated, engagement of the friction wheel 21 with the disc 23 will cause a rotation of the winding drum in one direction and engagement between the disc and wheel 22 will cause rotation in the opposite direction. Engagement of one or the other of said friction wheels 21 or 22 with the disc is caused through longitudinal movement of the shaft 20.

A detail of the clutch and relation of the shaft 20 thereto is shown in Fig. 25. It is to be noted that the pulley or sprocket 15 is not directly attached to the shaft 20 but drives the sleeve 28 which is mounted in ball bearings in brackets secured within the control box. The clutch consists of the friction discs 29 and 30 both having bevelled or V-shaped edges for a purpose hereinafter described, and the adjacent ends of the hubs of these discs are provided with gears 31 and 32. The sleeve 28 is provided with a block 33 situated between the gears, and this block is provided with pins 34 preferably three in number, on which are mounted similar gears 35 meshing with the gears 31 and 32 and forming a differential gear drive. Rotation of the sleeve 28 will thus drive both discs 29 and 30 at equal speeds if both be equally free to rotate. If one or the other of said discs is held from or retarded in rotation the opposite disc will rotate at greater speed and when released the two discs will return to normal relation through operation of a coiled spring 36, one end of which is attached to the disc 30 and the opposite end to the disc 29. If one disc rotates more rapidly than the other the spring is simply wound up and placed under tension and when released will return the discs to normal relation. The hub of the disc 29 is internally threaded and a block or key 37 is secured in a slot in the shaft 20, the edges of the block are threaded to engage in the threads of the hub of the disc 29 and the sleeve 28 is slotted at 38 and 39 to allow the key to pass therethrough.

By reason of the key 37 passing through both the sleeve 28 and the shaft 20, rotation of the sleeve 28 causes rotation of the shaft 20 continuously at normal speed, but if the disc wheel 29 be held from rotation the key 37 will rotate relative to the threads in the hub of the disc wheel causing the shaft 20 to move longitudinally. If the friction disc 30 be held from rotation, the disc 29 will be made to rotate faster than the shaft 20, causing a longitudinal movement of said shaft in the opposite direction. Both discs are mounted to rotate relative to the sleeve 28. It therefore, becomes evident that one or the other of the friction wheels 21 or 22 may be made to engage the friction disc by simply retarding the rotation of one or the other of the discs 29 or 30. Rotation of either friction disc may be retarded by bringing the brake-shoe 40 or 41 into engagement with its corresponding disc.

It is to be noted that the operation of the winding drum and connected mechanism is not dependent upon the extent of the power or force with which the brake-shoes engage the friction discs, as either shoe need only retard the respective disc to cause an endwise movement of the shaft 20, and it is also to be noted that the power applied to drive the shaft 20 need not be great in order to exert considerable power and operate the elevating planes E and E¹, as said power is transferred through the friction wheel 23, worm 25 and worm wheel 26 in a manner to multiply the force many times.

The power of the blades S therefore need not be great, as the force applied through the cables B, B¹, and the winding drum will be sufficiently great for all purposes.

Also by varying the size of the friction discs 29 and 30, and by variations of the pitch of the threads in the hub of the disc 29, and of the engaging key 37, any desired pressure between the friction wheels 21 or 22 and the disc 23 may be attained in order to transmit the necessary power to the worm shaft. By such alterations in design of the structure outlined any desired variation in speed of movement of the cables B and B¹, and the power exerted thereby may be varied to suit various types of aeroplanes and various conditions arising during flight.

Rigidly secured to the worm shaft 27 is a spur gear 42 which engages the rack teeth cut in the rod 43. The rod is attached to a piston 44 reciprocable in the case or cylinder 45. The movement of this piston is controlled by the balanced valve 46 shown in section in Fig. 23, and in plan view in Fig. 24. The casing or cylinder 45 is preferably filled with oil which may be utilized for lubrication of various parts as hereinafter indicated. There is a passage 47 and 48 at each end of the cylinder 45 through which oil may flow, both of which lead to the valve chamber 49. The valve has a central part 50, which fits the bore of the chamber and normally closes the passages and prevents oil from flowing from one end to the other of the cylinder 45, and so holds the piston and piston rod from moving, whereby the winding drum D is securely held from rotation at such times. By this means the elevating planes are firmly held in whatever position they are set until released therefrom by operation of the chain of mechanism. The valve 46 is provided with a lever 51 having a forked end engaging in a groove 52 in the shaft 20 as may be clearly seen in Fig. 22. When both the friction wheels 21 and 22 are out of contact with the friction disc 23, which is the normal condition of said parts, the valve 46 is in normal position in its case or chamber 49, and the channels connecting the opposite ends of the cylinder 45 are closed and the piston held from movement. Movement of the shaft 20 in one direction or the other by the clutch mechanism moves the valve and opens the said channel allowing a restricted flow of oil between the cylinder ends. Consequently a sudden deflection of the elevating planes is prevented as rotation of the shaft 27 and winding drum is controlled by movement of the piston 44 in the cylinder 45. The change in angle of the planes E and E¹ is thus gradually made.

Inasmuch as the oil displaced on that side of the cylinder in which the piston rod rides is less than the displacement upon the other side, oil will either be taken from or discharged into the passage 53 immediately above the valve chamber 49, with which it is in communication through ports 54 and 55. This chamber 53 has a pipe 56 connected therewith leading into a sump 57 from which oil may be drawn into the chamber and to which oil may flow from other parts of the mechanism. The chamber is also provided with a tube 58 leading to other devices or parts of the machine, the mechanism thus operating as a force feed oiler, which forces oil to the various parts which eventually finds its way to the sump, and is again taken up and forced through the tube 58, a part only of which is here shown but to which various distributing tubes may be connected as is commonly the practice in oiling devices. The tubes 56 and 58 are each provided with a ball check-valve each operating in the proper direction to draw oil from the sump and discharge it into the tube 58. By this arrangement all the mechanism in the control box may be continuously supplied with oil and the cylinder 45 is also maintained free of air at all times.

As before stated the clutch devices J and K are alike in all material respects, and it is through the medium of these devices that the winding drums are actuated. The winding drum D operates to alter the angle to the horizontal of the planes E, E¹, while the winding drum C operates to alter the angle of incidence of the sustaining planes the cables being so attached to the sustaining planes that if the angles of incidence of one plane is increased, the angle of incidence of the other is correspondingly decreased. By use of the hydraulic locking device above described, it will be readily seen that, if one of the friction discs be held from rotation by the corresponding brake-shoe, that certain gradual rotation of the corresponding winding drum is produced. As will be seen hereinafter, if the disturbing force producing the operation of one or the other of the brake-shoes ceases to operate, or is overcome by the change produced through operation of one or both the winding drums, the corresponding shoe is released from the retarding disc and the shaft 20 returned to normal position with both the bevel wheels out of contact with the bevel disc 23. This sets the valve with the central part 50 closing the channel between the opposite ends of the cylinder 45 which locks the corresponding winding drum C or D, and firmly holds either or both sets of planes, as the case may be, in the position required to counteract the opposing force.

The operation of the independent source of power and the means through which is operates to produce a change in the angle of the various planes thus becomes evident. The device or devices through which a fore-and-aft control of the machine is attained simply operates the brake-shoes 40 and 41, and the means for maintaining the machine in lateral balance operates a similar pair of shoes 60 and 61 engaging the friction discs of the companion clutch mechanism K. The means for maintaining the machine in lateral balance is shown somewhat diagrammatically in perspective in Fig. 27, details of the structure being shown in Figs. 27ᴬ and 27ᴮ. In Fig. 27, the discs 29ᴬ and 30ᴬ are indicated by dotted lines, and the mechanism through which motion is imparted from the clutch member K to the winding drum C is not indicated in Fig. 27 but the relation of parts and mechanism connecting the same is virtually the same as in Fig. 22 heretofore described. The lateral balance is controlled by means of a mobile weight such as a pendulum 62 universally pivoted at 63 to the vertical shaft 631 secured in the box or case H. The lower end of the pendulum, as may be seen in Fig. 27ᴬ, is provided with a roller which rides in a groove in a guide block 64 supported within the control box, which arrangement insures a swinging of the pendulum crosswise of the machine only. Extending laterally from the pendulum is a stud 65 carrying a block 66 on the end thereof. The end of the stud is circumferentially grooved at 67, as shown in Fig. 27ᴬ, and the block is apertured in two planes so that, when placed in position on the stud 65, the groove 67 is in alignment with the cross aperture in which a bent end of the link 68 engages. This bent end engages in one side of the groove 67 of the stud 65, thus preventing accidental withdrawal of the block 66 from the stud and also allowing for free movement of the stud 65 and bent end of the rod 68 therein. This pivotal connection between rods is used in many places, and the block 69 in Fig. 33 more clearly shows the arrangement of the rods in all instances of the use of a similar block. The inserted end of the bent rod is provided with a cotter pin or the like which prevents its accidental removal from the block. The link 68 is connected to a pivot block 70 on the cross bar 71, the opposite end of the crossbar being connected by similar blocks and link 72 to a depending end 73 of the rock shaft 74. By the swinging or pressure of the weight to and fro the shaft 74 is rocked one way or the other forcing the shoe 60 or 61 as the case may be, into contact with the corresponding discs 29ᴬ or 30ᴬ of the clutch mechanism causing a rotation of the winding drum C in one direction or the other which flexes the sustaining planes in a corresponding manner. It is therefore to be seen that if the machine, from any cause, tends to tip forward one side or the other, the weighted pendulum will immediately swing or tend to swing toward the lower side causing contact of the proper brake-shoe with its friction disc, and as the cords are so attached to the planes and the winding drum that the angle of incidence to the air of one plane is increased while that of the other plane is decreased, the plane on the lower side will be set at the greater angle of incidence causing that side to raise. Other examples of the function of the mobile weight are hereinafter given.

The lateral balance of the machine may be disturbed by sudden gusts of wind or change in direction of the flow of air. To counteract the effect of such change in the direction of flow, I have provided vanes V, V¹ which are pivoted at their front ends to the upper part of the planes P and P¹ outside of the area of influence of the propeller F. About midway of their length these vanes are connected by a cable or rod 75 and 76 respectively to a rock arm 77 attached to the upper end of the supporting pendulum member 631 and adapted to twist the pendulum on its vertical axis and thereby swing the cross bar 71 and link 72 and rock the shaft 74 causing a contact of one or the other of the shoes 60 or 61 with its corresponding disc wheel of the clutch mechanism. This causes a rotation of the winding drum C and produces a flexing of the sustaining planes reducing the sustaining force of one and increasing that of the other to counteract the effect of the disturbing force and maintain the machine in equilibrium in opposition thereto. The utility of the vanes V and V¹ is readily apparent in case of a sudden gust blowing crosswise of the line of flight of the machine, in which instance the vanes may swing to the right or the left, as the case may be, and flex the plane on the side adjacent to that from which the wind is blowing at the greater angle of incidence, and thus prevent the air current from turning the machine about its longitudinal axis. The action of the vanes, however, in nowise interferes with the independent action of the mobile weight as it may also flex the planes even when the planes are flexed by the vanes in the same or opposite direction as they tend to be flexed by movement of the weight.

As the weight swings or tends to swing to one side of the machine causing a contact of one of the brake-shoes with its corresponding disc of the clutch mechanism, it will be evident that said shoe will continue in contact with the wheel until the machine has righted itself and probably passed beyond the position of equilibrium before the weight swings to the opposite side of the machine causing a contact of the other shoe with its corresponding friction disc and flexing the planes in the opposite direction. As this would cause a continual oscillation of the machine about its longitudinal axis, it becomes necessary to provide a means whereby the planes are returned to normal angle as the machine becomes righted and such action prevented. To accomplish this the cross-bar 71 is attached to a vertical rod 78 having a universal pivotal connection 79 to a stud 80 carried in bearings in the enclosed case H, a detail of which is shown in Fig. 27ᴮ. The lower end of the rod 78 is provided with a roller riding in the guide block 81 whereby the said rod 78 may swing in only one direction cross-wise of the machine in the same manner as the weighted pendulum 62. The rod 80 is provided with an arm 82 extending at right angles thereto and connected by a link 83 with an arm 84 on the vertically positioned rod 85 mounted in bearings in the case. Near the lower end the rod 85 is provided with a worm segment 86 meshing with a worm 87 on the worm shaft 27ᴬ, of the winding drum C, corresponding to the shaft 27 shown in Fig. 22, which is also provided with a like worm and segment for a purpose hereinafter described.

It will be observed that when the weight swings or tends to swing to one side moving the rod 68, cross-bar 71, and rod 72, to rock the shaft 74, that the bar 71 may not turn on the vertical axis of the shaft 78 as such shaft is held from twisting by the rod 83 and connected parts. Therefore, the weight of the pendulum is transmitted directly to the rock shaft 74, causing a contact of the brake-shoe with its friction disc. This contact of the shoe and disc causes a consequent rotation of the shaft 27ᴬ, and the winding drum flexing the planes as heretofore stated. Rotation of the shaft 27ᴬ causes rotation of the worm 87, actuating the worm segment 86, rotating the shaft 85 and consequently, through the link 83 and connecting parts, rotating the shaft 78 on its vertical axis. This movement takes place after the shoe has been set and rotation of the drum begun and turns the cross-bar 71 tending to lessen or increase the distance between the arm 65 of the pendulum and arm 73 of the rock-shaft depending upon the direction of rotation of the drum shaft. The rotation of the drum flexes the planes and during the flexing of the planes the shaft 78 is turned to increase or decrease the distance between the lever 73 on the brake shoe shaft 74 and the end of the lever 65 on the pendulum and returns the two brake shoes to normal position, while the pendulum and the lever 78 are still out of normal position. The brake-shoes are thus reset for a succeeding operation without movement of the pendulum or the rod 78, and in returning to normal the pendulum and rod are not required to travel the full distance to normal position or beyond normal position to set the opposite brake-shoe and change the angle of inclination of the planes. Let it be supposed that the distance between said arms has been decreased. As the machine begins to right itself by reason of the flexing of the planes, the weight will begin to swing or tends to swing to normal position, but by reason of the decreased distance between the said arms, the arm 73 will be swung past its normal position before the pendulum has arrived at normal which sets the opposite brake-shoe on its corresponding disc and reverses the direction of rotation of the drum and alters the relative angle of the planes, thus bringing them to a correcting or compensating position in respect to the disturbing force at or before the time the machine attains its original position. If the weight swings or tends to swing to the opposite side, the worm and segment 87 and 86 will operate to increase the distance between the arms 65 and 73. In this case the weight will force or tend to force the arm 73 beyond normal, in the opposite direction to that in the first instance described before the weight has reached normal position which relaxes the set shoe and sets the free shoe. By this means oscillation of the machine about its longitudinal axis is prevented. The action of the swinging pendulum and the swinging cross-bar (which with related parts is hereinafter termed the "return mechanism") in maintaining the machine in equilibrium is shown in Figs. 4 to 11 inclusive. In Fig. 4, the machine is shown tripped at an angle to the direction of the action of the weight or mass of the machine. In this position the weight will swing or tends to swing to the right and will set the proper brake-shoe to rotate the drum C in such direction as to increase the angle of incidence of the plane on the right hand side of the machine and decrease that upon the left and thus tend to right the machine as it progresses through the air. As before shown, rotation of the winding drum shaft twists the swinging rod 78 on its vertical axis through operation of intervening mechanism, and causes a relative offset between the arms 65 and 73 as heretofore described. At the same time the machine in righting tends to rotate back to normal and, therefore, the weight will tend to swing back toward the center but, by reason of the offset, the brake-shoe will become released from the corresponding friction wheel before the weight has reached the center of its swing so that the rock shaft 74 and rock-arm 73 thereon will have passed or tend to pass beyond its central neutral position thus setting the opposite brake-shoe, which through the connected mechanism reverses the direction of rotation of the winding drum. This relation of parts will be assumed at approximately the time the machine has reached the position shown in Fig. 5. If the force causing the original disturbance has ceased to act, the machine will continue to right itself and eventually assume the position shown in Fig. 6, but should the oscillation be so great as to carry the machine beyond the position shown in Fig. 6, the pendulum would continue its movement resulting in further flexing of the cords A and A¹; as indicated in Fig. 5, until the movement is stopped and reversed to bring it to the position shown in Fig. 6. Therefore, if the force tending to oscillate the machine be great the return mechanism will tend to dampen or decrease the oscillation and the construction and relation of parts is such that this resultant action occurs whether the disturbing force tends to tip the machine in one direction or the other.

Fig. 7, is a plan view of the machine, and is a diagram illustrative of the action of the parts when a gust of wind blows across the line of flight of the machine. Such gusts will throw the vanes V and V¹ parallel with the direction of movement of the gust, and through the connecting cords or rods 75 and 76, will twist the swinging weight on its vertical axis, thus setting one or the other of the brake-shoes depending upon the direction of the deflection of the vanes. By this means the winding drum C will be rotated in one direction or the other and the planes flexed in a manner to counteract the effect of the gust. That is, the angle of incidence of the plane on the windward side will be increased, while that upon the leeward side will be decreased. The return mechanism is also operative under this condition because if the gust suddenly ceases the plane on the windward side would tend to lift and rotate the machine, but by reason of the offset heretofore described having occurred prior to such action, the weight would immediately tend to dampen the oscillation through flexing the wings in the opposite manner. If the gust be sufficient to cause a movement of the machine sideways, the action of the vanes on the rock-arm 77 and through it to the brake-shoe would be increased.

Fig. 8, shows the machine when the vanes have been returned to the original position and it is to be noted that the secondary or return action is as necessary as in the first instance. While the position shown in Fig. 8, may not always be maintained, the action started in Fig. 7, is necessary to counteract the effect of the gusts often encountered during a windy day. Gusts of short duration would often cease before the position shown in Fig. 8, is reached, in which case the secondary action or return will operate to bring the machine to normal before the flexed wings can turn it farther over.

Fig. 9 is a diagram of the machine making a turn. This condition is brought about by turning the rudder to one side, which results first, in swerving the tail of the machine out of its natural path causing the vanes V and V¹ to be deflected to a position out of the normal as shown in said Fig. 9. This would at once result in an action to start the machine to assume a banking angle. The weight would then swing away from the perpendicular to the earth as the machine was banked till the position shown in Fig. 10 was reached where, in still or uniform velocity of air, the weight would always tend to hang in the direction of the line E—O, with the same rudder deflection, due to centrifugal force.

In order that it may be understood how the machine may remain in balance while turning the curve with the inside wing at a greater angle than the outer one, reference may be made to Fig. 9. Considering the line A—B as passing through the center of gravity of the machine, the lines of the passage of air will be about a center positioned at some point on this line. Since the machine is turning on a radius, and considering the air as being still, the effect thereof on the control apparatus will be the same as if the air were moving in a circle on a stationary machine. Therefore, if the vanes V and $V^1$ are placed forward of this line as shown, they will, after the machine has reached the banked position, still be deflected from the normal center line and, therefore, the swinging weight twisted and the arm 65 deflected from normal. Now the machine can only be in balance when the crossbar 71, and therefore, the rock arm 82, is rotated through its connection to the drum C, so that the offset between the pendulum arm 65, and rock arm 73 is equal to the deflection of the arm 65 caused by movement of the vanes V and $V^1$. This may not at all times exactly hold the machine in the position shown in Fig. 10, but under the action described the machine will find a position in which flight will be continued as perfectly as if in theoretical balance, and such position will be assumed even if there be a shifting in the weight carried by the machine, or partial impairment of the lifting power of the wings due to repair or accident. The general condition is shown in Fig. 11, where the arrow indicates the direction of action of the mass whether it is in the line of the center of gravity or inclined thereto, as in Fig. 10. This position may be maintained by the control mechanism by reason of the displacement of the mobile weighted pendulum being nutralized by the twisting of the swinging cross bar produced by the winding drum C. The wings are held in flexed position by the hydraulic locking device heretofore described.

It is therefore, to be seen that the principle of the "return" or "offsetting" mechanism, is of vital importance, as it is through operation of this device that the control mechanism becomes practical as such return mechanism dampens out the tendency to periodic vibration, holds the machine in any necessary position to balance an unnatural condition, and provides an automatic adjustment for changes in the machine. In the fore-and-aft balance and control of the machine, there are two principles involved. First, that a rapidly revolved mass, as a flywheel, will resist force tending to rotate it in any direction except about its own axis of rotation. This property of a rotating mass is utilized to create a relative movement of parts operating through connecting and controlling levers to automatically alter the fore-and-aft angle of the machine in respect to the horizontal as the machine varies therefrom, or from the angle of the desired line of flight. The second principle of the fore-and-aft control is the same secondary or return action as described heretofore in connection with the lateral control.

The mechanism involved in the fore-and-aft control is shown diagrammatically in Fig. 31, which is a bird's-eye view of the relative position and mechanical relation of the parts. Details of the various parts of the mechanism are also shown in Figs. 29, $29^A$, 30, 31, 32, and 33. The fly-wheel 97 is driven by the wind-wheel S, utilized to drive the clutch members J and K, which drives the shaft 19 by means of a cord 17 and pulley 18. As may be seen in Fig. 30, the shaft 19 is provided with a worm wheel 90. The shaft is provided with suitable bearings mounted in the case or box H, and the worm wheel is preferably enclosed within a casing 91. As may be seen clearly in Fig. 29, the worm wheel meshes with a worm 92 on the stub shaft 93, supported in the said case 91. To this shaft is secured a collar 94 to which is fastened a spiral spring 95. This spring by a similar method of fastening drives the shaft 96 of the fly wheel 97, which shaft is supported in suitable bearings 98 and 99. These bearings are carried in a supporting frame 100, the upper part of which has arms 101, 102, pivotally connected to a ring 103, as may be seen in Figs. 29 and 31. This ring in turn is pivotally supported at 104 and 105, at right angles to the pivotal supports for the said arms, to the lower part of the case 91 for the worm wheel, thus forming a universal pivotal support for the fly-wheel frame. Rods 106 and 107 are rigidly attached to the ring 103, which are united below the fly-wheel and form a support for the universal block 108, shown more particularly in Fig. $29^A$.

This method of mounting the fly wheel allows the aeroplane to swing freely in the vertical transverse plane enabling the machine to be banked and allows for other changes in the lateral equilibrium without disturbing the fly wheel frame, but any force exerted on the universal ring or block 103 tending to turn the frame about a transverse axis will be resisted by the weight of the wheel and tendency of a revolving wheel to dampen or slow down the deflection produced by force. This property is used to create or tend to create a movement of parts, as the machine varies from the desired line of flight, to operate controlling levers as hereinafter described. The center line of both sets of pivotal points of support of the frame and ring are on the center line of the spring 95, which thus provides a flexible drive for the fly-wheel. From the foregoing it becomes evident that the revolving fly wheel is not truly gyroscopic in its effect as the machine may oscillate about the longitudinal axis without altering the relation of the gyroscope and its connected levers with the control mechanism, and it is also to be noted that no excessive speed of revolution of the fly wheel is contemplated as the effect of the revolving weight is all that is required. By this method of support it will also be noted that the weight of the device is nearly all below the point of support which alone, in the average case, would hold the fly wheel frame on a plumb line.

As may be seen in Fig. 31, the block 108 is connected by a rod 109 to a cross-bar 110, and the opposite end of the cross-bar, by a link 111 and pivot blocks, is connected to a cross-bar 112. The opposite end of the bar 112 is connected by a link 113 to a rock arm 114 which is secured to a rock-shaft 115 pivotally supported in the casting 116 shown more clearly in Fig. 33. The shaft 115 is also provided with a rock-arm 117 to the end of which is secured, by means of a pivot block 69, a telescoping arm or rod 118, the opposite end of which is pivotally secured to the rock arm 119, secured to the rock shaft 120. On this shaft are the shoes 40 and 41 adapted to engage the respective discs of the clutch mechanism J, a detail of which is shown in Fig. 22. The relation of the shoes to the winding drum D and connected mechanism having been heretofore described, the connection of such parts, although not fully shown in Fig. 31, will be readily understood.

The cross-bar 110 is preferably formed integrally with a vertical member 121, the lower end of which is provided with a roller riding in a groove in a guide block 122 and secured at the upper end, by a universal coupling 123, to a vertical shaft 124. By means of the guide-block the vertical member 121 may swing only in a vertical plane longitudinally of the machine but may be turned on its vertical axis to effect an offset in the relation of parts, the function of which is identical with that of the return mechanism described in relation to the lateral control. The shaft 124 is connected by an arm 125, link 126, and arm 127 to a vertical shaft 128 having a worm segment 129 on the lower end thereof engaging a worm 130 on the shaft of the winding drum D.

The cross-bar 112 is supported at the lower end of a vertical shaft 131. A slight distance above the cross-bar 112 is a roller 132 riding in a guide block 133 integral with the casting 116. The upper end of the vertical shaft 131 is connected to a vertical shaft 134 by a universal joint 135, the purpose of which connection is hereinafter described. By means of the guide block 133, the vertically positioned rod 131 may swing only in a direction parallel with the longitudinal axis of the machine. As both the rods 121 and 131 are held from rotation by any force tending to twist the cross-bars 110 or 112, longitudinal movement of the rod 109 in one direction or the other moves or tends to move the cross-bars 110 and 112 in parallel relation and through such movement the rock-shaft 115 turns the rock arm 117 moving or tending to move the rod 118 longitudinally to oscillate the brake-shoe shaft 120. As seen in Fig. 33, the rod 118 is tubular in form and the rod 136 telescopes therein, which rod is pivotally connected to the rock arm 119. The tube 118 is slotted longitudinally as shown, and the rod 136 is provided with pins 137 and 138 engaging in these slots in the tube 118. About the tube 118 is a coiled spring 139 held in place by collars with which the tube is provided, and the pins 137 and 138 are of sufficient length to pass through the slots in the tube 118 and engage each end respectively of the spring. Therefore, if the arm 117 be swung toward the clutch mechanism to set the brake-shoe 40, the arm may still continue its movement after the brake-shoe has been set as the spring will be compressed to allow for such movement. Likewise, upon movement of the arm to set the brake-shoe 41, the spring will be similarly compressed by the pin 137. Thus greater movement of the rock-arm 117 may take place than is required to set either brake-shoe, and allows the fly wheel frame to assume any possible position relative to the longitudinal axis of the machine without forcibly deflecting it or producing an undue strain upon the connecting parts. It is also to be seen that if the machine turns from its horizontal line of flight, the fly wheel frame will remain perpendicular in the manner of a pendulum causing one or the other of the brake-shoes to be set on its corresponding friction disc, and a corresponding rotation of the drum wheel D produced. The cords B and $B^1$ being attached, in a manner heretofore described, to the elevating planes E and $E^1$, a rotation of the winding drum causes a deflection of these planes, and the parts are so related, that a change in the horizontal angle of the machine will set the planes to return the machine to the horizontal angle. By means of the secondary or return mechanism actuated through the worm wheel 130, and the connected parts to the vertical shaft 121, an offset is produced twisting the cross-bar 110 so that as the machine rights itself under action of the planes, the planes are returned to a correcting or compensating position with respect to the disturbing force, prior to the time the machine has reached its original position, thus preventing a longitudinal oscillation in the same manner as the return mechanism heretofore described prevents lateral oscillation.

As long as the vertical shaft 131 is held from twisting, the machine will be maintained in the same line of flight and in order that the operation of the fore-and-aft control may be fully understood reference may be had to Figs. 11$^A$ to 17 inclusive. Suppose the machine departs from the line of flight from any cause and is made to assume the position shown in Fig. 11$^A$. Under this condition the fly wheel frame will have moved in respect to the machine, and, by its connection to the rock-arm 119 through the cross-bars 110 and 112, and connecting rods, will apply one of the brake shoes and operate the winding drum D, winding up the cord B$^1$ and letting out the cord B which will turn the planes E and E$^1$ to position tending to elevate the machine to position as shown in Fig. 12. Through operation of the secondary mechanism which twists the shaft 121, the planes will be brought back to a correcting or compensating position before the machine attains its original line of flight, shown in Fig. 13, and a fore-and-aft oscillation of the machine is prevented.

Fig. 14 is illustrative of a condition of balance of the machine when the center of weight has been shifted back from normal position producing a deflection of the fly wheel frame opposite to that of Fig. 11$^A$, and by means of the secondary or offsetting mechanism the planes will be so set as to maintain a direct line of flight under this condition, as the offset or twisting of the rod 121 will equal the deflection of the fly wheel frame, and therefore the machine will remain in equilibrium.

As may be seen in Figs. 31 and 34 the tiller lever T is pivoted at 140 so that it may be moved up or down. The lever is provided with an arm 141 connected by a universal joint to a rod 142, which in turn by like connection is attached to the arm 143 pivoted at 144. The arm 143 is connected by a link 145 to a rock arm 146 to which is secured a slotted arm 147. A similar slotted arm 148 is secured to the shaft 134 universally pivoted to the vertical arm 131 heretofore described. Engaging in the slot of each arm 147 and 148 is a pin 149 carried in the rod 150, shown clearly in Fig. 35. As long as this pin is held in position in the slots, movement of the lever T in a vertical plane will twist the vertical rod 131 on its longitudnal axis and cause an offset in the cross-shaft 112, actuating the arm 114, and the arm 117 and by such interposed means rock or tend to rock the shaft 120 to set one or the other of the brake-shoes depending upon the direction of movement of the tiller T.

If the machine is in equilibrium, the vertical shaft 121, and the frame or carrier of the fly wheel are at rest and movement of the tiller lever T will swing the slotted arm 148 and twist or tend to twist the vertical shaft 131 setting one of the brake-shoes and thus cause a change in the position of the planes E and E$^1$ corresponding thereto. If the movement of the tiller lever T is in an upward direction, the brake-shoe 41 would set, and the drum D rotated in a manner to wind up the cable B$^1$ and let out the cable B. The result of this action of the winding drum would be the same as indicated in Fig. 11$^A$, which represents the old line of flight at the time the lever T was moved, and in Fig. 13 which represents the new line of flight. The machine would be in balance with the frame of the fly-wheel still in the same position but changed apparently in respect to the machine equal to the deflection or offset caused by the twisting of the vertical rod 131. The machine will now be held in its new line of flight by the fly wheel and connected mechanism, including the return mechanism, in the same manner as originally and, therefore, the aviator may manually control the ascent or descent of the aeroplane.

Inasmuch as it is necessary, in order to maintain the speed of movement of the machine, that there be a change in the line of flight of the machine should the propeller thrust stop, and also as it is necessary that the possible change be from the maximum climbing angle to the minimum gliding angle as shown in Figs. 14 and 15, provision is made whereby such change may be automatically produced.

As heretofore stated the tiller lever T is movable up and down about the pivot points 140 in the head 151 secured at the rear of the enclosing case H. This head is provided with a stop 152 limiting the upward movement of the lever and determining the maximum climbing angle. A stop 153 is also provided limiting the downward movement of the lever and determining the maximum gliding angle. The head 151, as may be seen in Fig. 34, is free to turn in its bearing in the case which allows the tiller lever to be swung to one side or the other to deflect the rudder and the two movements may be made at the same time. That is, the lever may be turned to one side and raised or lowered with practically the same movement as occassion may demand. The stops 152 and 153 may be adjustable, if desired, or be determined and set within safe limits for each machine. As seen in Figs. 31 and 34, the stop 153 engages the upper face of the tapered block 154 slidable in a guide way in the casing whereby the extent to which the lever T may be depressed is varied under certain conditions hereinafter described.

To effect any change in the relation of the control parts of the machine when the propeller thrust stops, it is necessary that there be a positive movement resulting from such stopping of the propeller. An arrangement of parts is shown in Figs. 1 and 36, whereby such positive movement is attained. Fig. 36 is a vertical section taken longitudinally of the propeller shaft. The propeller is secured to a hub 155 which is keyed to the shaft 157 and held in place thereon by the nut 156. The shaft 157 has ribs thereon at the rear end, a cross-section of which is shown at 157$^a$, and a bearing 158 is provided for the shaft near the propeller end supported in the aeroplane body. The splined end of the shaft as shown in cross-section is inserted in a correspondingly grooved hub 159, in which it is capable of longitudinal movement and in which it is held by the spring cage 160. The end of the spring 161 in the cage engages against the ball bearing 158, and forces the rear end of the cage 160 against the projections on the shaft normally forcing it into the hub 159 to the fullest extent. In the drawing the shaft is shown as partly withdrawn from the hub 159 and the spring compressed which is the condition of the parts during operation of the propeller, the pull of which under operation produces such condition. The hub 159 is connected by a flange coupling 162 to the engine shaft 163 or to the shaft operated by the engine. It is thus to be seen that the thrust of the propeller shaft is taken on the ball bearing 158, and Fig. 36 indicates the normal condition of parts as long as the propeller thrust exists, but if the propeller thrust ceases, either by reason of the engine stopping or of the breaking of the propeller or other cause, the spring 161 will force the propeller shaft backward in the splined case or hub 159 until either the shaft end engages against the flange coupling or the cage 160 engages against the splined hub 159. By altering the tension of the spring 161 it is evident that longitudinal movement of the shaft may be produced either under small or great decrease in the propeller thrust as may be desired.

The hub 155 has a circumferential groove 164 on that end adjacent the aeroplane body and this groove is engaged by the forked end of the lever 165 pivotally supported on the aeroplane frame at 166. The opposite end of the lever is pivoted at 167 to a rod 168, the relationship of which to the control mechanism is indicated in Fig. 31, and the extent of movement of this rod is always the same under cessation of the propeller thrust as is shown in dotted lines in Fig. 36. Near the end of the rod 168 is a block 169, between which and the end of the rod is a coil spring 170. On the under side of this block, as shown in Fig. 32, is pivotally secured one arm of a bell crank 171, the opposite end of which is forked at 172 engaging a pin 173 in a sliding block 174. To this block is attached the rod 150 heretofore described, having a pin 149 engaging in the slots in the levers 147 and 148. The rod 168 is provided with a collar 175 which engages against the block 169 at all times during flight. This collar 175 holds the bell crank 171 from rotation to the left from the position shown in Fig. 31, and, should the propeller thrust stop, the collar 175 automatically moves toward the left as shown by dotted lines in Fig. 36 carrying the bell crank with it and sliding the block 174 in its guide groove 176 formed in a convenient part of the casing H. This movement carries the link 150 and the pin thereon with it, and as the slotted arm 147 is held stationary through its connection to the lever 143 and tiller lever, will move the slotted arm 148 and twist the shaft 131. As heretofore shown such movement of the lever 148 will produce a corresponding change in the machine's line of flight through operation of the elevating planes E and E$^1$ by the brake shoe 40 and winding drum D. It is therefore, merely necessary to set the parts in such relation that this movement of the sliding block will rotate the slotted arm 148 to the same extent possible by lowering the tiller lever to engage until 153 engages 154, which determines the minimum gliding angle shown in Fig. 15, at which angle it will be maintained in balance at normal speed as heretofore described. While this arrangement and relation of parts reduces the range of flight possible for the machine, it is evident that the parts may be set for each individual machine with which the apparatus is adapted for use so that there may be no descent made at so great an angle that a fall is possible.

A landing lever L is also provided through operation of which the machine may be brought to earth without shock. This lever is pivoted at 144 relative to the lever 143 as heretofore described and has a part 180 extending into the path of movement of the sliding block 174. When the engine is stopped and aviator desires to land, this lever is moved in a direction away from the lever T shown in Fig. 31, which will force the block 174 from the position assumed under a stopping of the propeller thrust back to normal position turning the bell crank 171 dulum adapted to swing in a transverse plane, a cross-bar mounted to swing in a transverse plane, a rod connecting the pendulum with the cross-bar, a rod connecting the opposite end of the cross-bar to a rock-arm of the rock-shaft whereby movement of the weight from a neutral position may rock said rock-shaft, and means connected with the winding drum driving means adapted to twist the cross-bar and cause an offset in the parts connecting the pendulum and rock-shaft whereby the rock shaft is actuated in a reverse direction under reverse movement of the pendulum prior to its return to normal position.

8. In a flying machine, the combination of mechanism for banking said machine, a vane controlled by the air and a movable weight, each exercising control over said banking mechanism, transmitting means intermediate the vane and weight and said mechanism, offsetting means and apparatus controlled by said offsetting means for affecting said transmitting means, whereby as the machine swings towards normal position the operation of the banking mechanism is reversed before such machine returns to normal position.

9. In a flying machine, the combination of mechanism for banking said machine, a vane controlled by the air exercising control over said mechanism and a movable weight having a neutral position, means intermediate the weight and the banking mechanism whereby the weight exercises control over the banking mechanism when moved from neutral position, means for producing an offset in said intermediate means whereby the weight causes a reversal in the action of the banking mechanism before the machine returns to neutral position.

10. In a flying machine, the combination of equilibrium maintaining means therefor, including a source of power, a reversing transmission mechanism, pressure-controlling devices for the determination of the direction and extent of operation of the reversing transmission mechanism, and means for proportionately transforming the pressure of the controlling devices to an effective effort of engagement on the reversing transmission mechanism.

11. In a flying machine, the combination of a plane, means for tilting said plane, mechanism for controlling said tilting means including a frictionally-operated clutch, a rotatable vibratory pendulum and an air-operated vane.

12. In a flying machine, the combination of a plane, means for tilting the plane, apparatus controlling said tilting means, including a frictionally-operated clutch, a rotatable vibratory pendulum and an air-operated vane adapted to rotate said pendulum when moved from normal.

13. In a flying machine, the combination of a tiltable plane, means for deflecting said plane, apparatus for controlling said means including a vibratory rotatable pendulum and means for rotating the same and mechanism controlled by said means for offsetting the effect of said apparatus on said means.

14. In a flying machine, the combination of means to restore the equilibrium of said machine when deflected therefrom, a source of power for operating said means, a friction transmission clutch device for transmitting power from said source to said means, pressure exerting mechanism tending to exert pressure in proportion to the deflection of the machine from a state of equilibrium, and apparatus including frictionally operated means governed by said mechanism and controlling said clutch device.

15. In a flying machine, the combination of a vertical rudder, means for automatically maintaining the machine in balance, a source of power carried by the machine for operating said means, a directional air actuated vane independent of the rudder regulating the power applied to said means and adapted to automatically cause said means and said source of power to initiate the banking operation to balance the machine to the disturbance of balance caused by the deflection of the rudder.

16. In a flying machine, the combination of a vertical rudder, mechanism for automatically maintaining the machine in balance, including a directional air-actuated vane independent of the rudder for automatically causing said mechanism to initiate the banking operation to balance the machine to the disturbance of balance caused by the deflection of the rudder.

17. In a flying machine, the combination of a plane, means for deflecting said plane, apparatus controlling said means including a suspended rotatable pendulum and an air-operated vane for rotating said pendulum and offsetting mechanism controlled by said means for offsetting the effect of said apparatus on said means.

18. In combination with a flying machine normally in a state of equilibrium, means for maintaining the flying machine in equilibrium, apparatus controlling said means including a frictionally operated clutch, a suspended rotatable pendulum and an air-operated vane and mechanism controlled by said means for offsetting the effect of said apparatus on said means.

19. In a flying machine, normally in a state of equilibrium, devices for driving said machine including an engine, means for maintaining said machine in equilibrium including a source of power operable independent of said engine and apparatus controlling said means including a suspended rotatable pendulum and an air-operated vane.

20. In a flying machine normally in a state of equilibrium, means for maintaining said machine in equilibrium, controlling apparatus for said means including a frictionally operated clutch for varying the controlling effect of said means and a plurality of independently operated devices and mechanism common to said devices for applying to said clutch the resultant of the controlling effects of said devices.

21. In a flying machine, normally in a state of equilibrium and means for maintaining said machine in equilibrium, controlling apparatus for said means including a plurality of simultaneously and independently operated devices, one of which consists of an air-operated vane and mechanism common to said devices for applying to said means the resultant of the controlling effects of said devices.

22. In a flying machine normally in a state of equilibrium, means to maintain said means in equilibrium, apparatus for controlling said means including a plurality of independently operated devices, one of which consists of a constantly rotating pendulum and mechanism common to said devices for applying to said means the algebraic sum of the controlling effects of said devices.

23. In a flying machine normally in a state of equilibrium, means to maintain the machine in equilibrium, controlling apparatus for said means including an air-actuated vane and a pendulum, transmission mechanism including a suspended swinging member between said vane and pendulum and said means and offsetting means controlled by said means for varying the effective length of said transmission mechanism.

24. In a flying machine normally in equilibrium, means to maintain said machine in equilibrium, controlling apparatus for said means, reciprocatory transmission mechanism between said apparatus and said means and offsetting means controlled by said first named means including a suspended member, one end of which reciprocates with said transmission mechanism, said offsetting means being operable by said first named means to vary the effective length of said transmission mechanism.

25. In a flying machine normally in equilibrium, means to maintain said machine in equilibrium, controlling apparatus for said means including a pressure operated device and pressure exerting means, pressure transmission mechanism between said pressure exerting means and said pressure operated device and offsetting means controlled by said first named means for varying the effective length of said transmission mechanism.

26. In a flying machine normally in equilibrium, means to maintain said machine in equilibrium, controlling apparatus for said means including a frictionally-operated clutch and a plurality of pressure exerting devices, pressure transmission mechanism between said clutch and said devices and offsetting means controlled by said first named means for varying the effective length of said transmission mechanism.

27. In a flying machine normally in equilibrium, means to maintain said machine in equilibrium, controlling apparatus for said means including a frictionally-operated clutch and a pressure exerting device, pressure transmission mechanism between said device and said clutch and offsetting means controlled by said first-named means including a member stationarily pivoted at one end and adapted to be reciprocated at the other end for varying the effective length of said pressure transmission mechanism.

28. In a flying machine, the combination of means including a source of power and a pressure-operated device to cause said machine to tilt about an axis thereof, controlling apparatus therefor including a source of pressure and modifying mechanism comprising offsetting means and an air-directed vane, and continuous pressure transmission mechanism between said apparatus and said pressure-operated device.

29. In a flying machine, the combination of means including a source of power and a pressure-operated device to cause said machine to tilt about an axis thereof, controlling apparatus therefor including a source of pressure and modifying mechanism comprising offsetting means and an air-directed vane, and continuous pressure transmission mechanism between said apparatus and said pressure-operated device, said vane controlling said source of pressure.

30. In a flying machine, the combination of means including a source of power and a pressure-operated device to cause said machine to tilt about an axis thereof, controlling apparatus therefor including a source of pressure and modifying mechanism comprising offsetting means and an air-directed vane, and continuous pressure transmission mechanism between said apparatus and said pressure-operated device, said vane controlling said source of pressure and being responsive to air direction to take a given operative position, said position controlling the tilting of the machine.

In testimony whereof, I sign this specification in the presence of two witnesses.

OTTO W. GREENE.

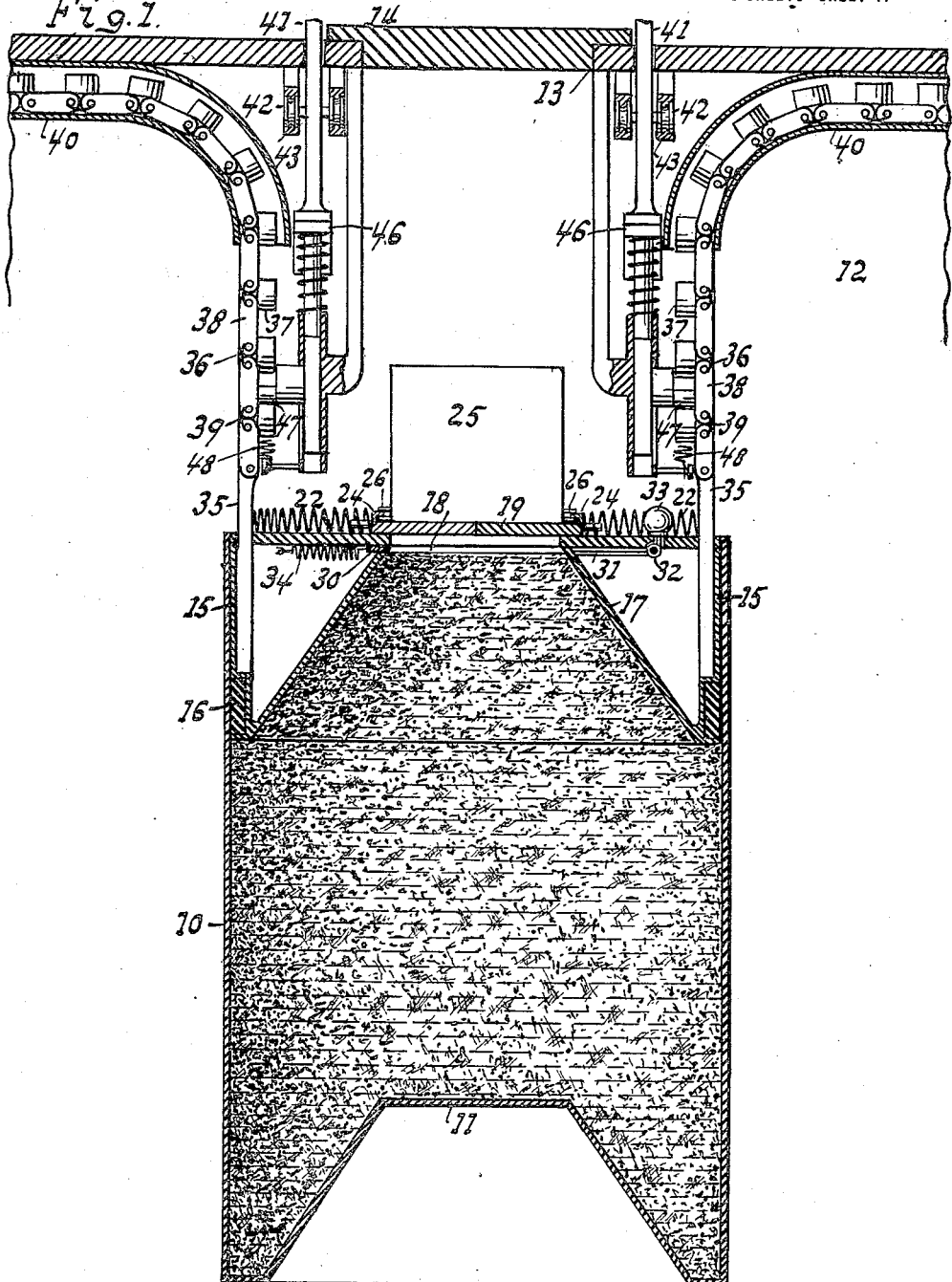

Witnesses:
W. F. BAKER,
W. S. FISHER.